United States Patent
Oi et al.

(10) Patent No.: US 8,483,885 B2
(45) Date of Patent: Jul. 9, 2013

(54) SYSTEM STABILIZING DEVICE

(75) Inventors: Kazunobu Oi, Tokyo (JP); Masakazu Muneshima, Tokyo (JP); Akihiro Kimura, Tokyo (JP)

(73) Assignee: Meidensha Corporation, Tokyo (JP)

( * ) Notice: Subject to any disclaimer, the term of this patent is extended or adjusted under 35 U.S.C. 154(b) by 286 days.

(21) Appl. No.: 12/989,935

(22) PCT Filed: May 8, 2009

(86) PCT No.: PCT/JP2009/058702
§ 371 (c)(1),
(2), (4) Date: Jan. 7, 2011

(87) PCT Pub. No.: WO2009/136640
PCT Pub. Date: Nov. 12, 2009

(65) Prior Publication Data
US 2011/0118885 A1  May 19, 2011

(30) Foreign Application Priority Data
May 9, 2008  (JP) .................... 2008-123040

(51) Int. Cl.
G05D 3/12 (2006.01)
G05D 17/00 (2006.01)
G05D 5/00 (2006.01)
G05D 9/00 (2006.01)
G05D 11/00 (2006.01)

(52) U.S. Cl.
USPC .................................. 700/293; 700/287

(58) Field of Classification Search
USPC ................................. 700/293, 287
See application file for complete search history.

(56) References Cited

U.S. PATENT DOCUMENTS
| | | | | |
|---|---|---|---|---|
| 4,967,129 A | * | 10/1990 | Tanaka | 318/621 |
| 7,180,206 B2 | * | 2/2007 | Haugs et al. | 307/102 |
| 7,902,692 B2 | * | 3/2011 | Darroman et al. | 307/10.1 |

FOREIGN PATENT DOCUMENTS
| | | |
|---|---|---|
| JP | 10-014251 | 1/1998 |
| JP | 2007020361 | 1/2007 |
| JP | 2007129845 | 5/2007 |
| JP | 2007244068 | 9/2007 |

OTHER PUBLICATIONS
International Search Report in corresponding PCT App. No. PCT/JP2009/058702.

* cited by examiner

*Primary Examiner* — Mohammad Ali
*Assistant Examiner* — Ziaul Karim
(74) *Attorney, Agent, or Firm* — Foley & Lardner LLP

(57) ABSTRACT

A self-contained control unit of a system stabilizing device installed on a microgrid is provided with a fluctuation detecting block 70A for determining a fluctuation component of the frequency of system voltage (C$\omega$s) and a fluctuation component of voltage amplitude of the system voltage (C|Vs|). The fluctuation detecting block 70A determines the fluctuation component (C$\omega$s) based on a deviation between the output signal of a low-pass filter 71 for noise removal and the output signal of a low-pass filter 72 for determining a fluctuation detection time. An interference action inhibiting unit 100 judges whether system stabilizing control and governor control of a generator interfere with each other, based on a frequency signal $\omega$s and the fluctuation component C$\omega$s. If there is interference, the time constant of the low-pass filter 72 is reduced to reduce the fluctuation component C$\omega$s, thereby decreasing the amount of control by the system stabilizing device and preventing interference. By this measure, system stabilizing control is exercised, without interfering with the governor control or AVR control of the generator.

4 Claims, 12 Drawing Sheets

SYSTEM STABILIZING DEVICE

TECHNICAL FIELD

This invention relates to a system stabilizing device, which is designed to be capable of exercising optimal system stabilizing control during an isolated or self-supporting run, without interfering with generator governor control or AVR (automatic voltage regulating) control.

BACKGROUND ART

Power generation utilizing natural energy such as sunlight or wind power is generally susceptible to environmental influence, and the amount of power generation fluctuates greatly. A system stabilizing device is used for the purpose of accommodating or absorbing this fluctuation.

In a microgrid having a network constructed by installing a power source, such as natural energy, near the electric power demand side, the installation of a system stabilizing device, which keeps demand for and supply of electric power in balance, is necessary for system stabilization.

An example of the microgrid (electric distribution or distribution system) equipped with a system stabilizing device will be described by reference to FIG. 7. FIG. 7 shows an example in which an existing superior power system (superior distribution system) 1 and a distribution system (microgrid) 10 are connected via a line impedance Ls and a circuit breaker 2.

A dispersed generation plant 11 and a load 12 are connected to the distribution system 10 which is the microgrid. The dispersed generation plant 11 is illustrated as a single generator in FIG. 7. Actually, however, it is composed of a plurality of dispersed facilities for power generation, which include natural energy type power generation equipment utilizing natural energy (e.g., photovoltaic power generation equipment or wind power generation equipment), and internal combustion engine type power generation equipment driven by an internal combustion engine (e.g., diesel power generation equipment). Also, the load 12 is actually a plurality of dispersed loads.

With the microgrid 10 as shown in FIG. 7, the amount of power generation varies or fluctuates greatly according to weather conditions, wind speed, etc., because it has natural energy type power generation equipment.

In order to accommodate such fluctuations in the amount of power generation, therefore, a system stabilizing device 20 is used.

With the internal combustion engine type power generation equipment, output power is adjusted by governor control. However, governor control is slow in response. Thus, if electric power consumed by the load 12 suddenly changes, the internal combustion engine type power generation equipment cannot follow such a sudden change (sudden excess or deficiency) in electric power. The system stabilizing device 20 is used for the purpose of following such a sudden change in electric power with good response, thereby assisting the internal combustion engine type power generation equipment to balance demand for and supply of electric power.

The system stabilizing device 20 is a power converter having a power storage function, and is provided in the distribution system 10 in a state connected in parallel with the dispersed generation plant 11 and the load 12.

The system stabilizing device 20 has a self-contained control unit 21, an interconnected control unit 22, a change-over switch 23, a current control unit 24, a PWM (pulse width modulation) modulator 25, a power converter 26 capable of an inverting action and a converting or rectifying action, and a direct current charging unit 27 such as an electric double layer capacitor or a battery.

The power converter 26 acts responsive to a gate signal g fed from the PWM modulator 25. This power converter 26, when performing a converting action, converts an alternating current power obtained from the distribution system 10 into a direct current power, and charges this direct current power into the direct current charging unit 27. When performing an inverting action, the power converter 26 converts the direct current power charged in the direct current charging unit 27 into an alternating current power, and sends this alternating current power to the distribution system 10.

In the system stabilizing device 20, moreover, a system current Is, which flows from the power system 1 into the distribution system 10, is detected by a current detector 28, a system voltage Vs which is the voltage of the distribution system 10 is detected by a voltage detector 29, and a converter current $I_{inv}$ inputted to and outputted from the power converter 26 is detected by a current detector 30.

With the system stabilizing device 20, under normal conditions where no breakdown or the like occurs in the power system 1, the circuit breaker 2 is in a connected state, so that "a system-interconnected run", an operation performed with the distribution system 10 being tied to the power system 1, is carried out. During the system-interconnected run, electric power is supplied to the load 12 by the power system 1, the dispersed generation plant 11, and the system stabilizing device 20.

During this system-interconnected run, a movable contact 23a of the change-over switch 23 is thrown to the A side as indicated by a dashed line in FIG. 7. As a result, the gate signal g obtained under control of the interconnected control unit 22 is fed to the power converter 26 to actuate the power converter 26.

During the above system-interconnected run, the system stabilizing device 20 acts to detect the system current Is flowing into the distribution system 10, determine a system power from the system current Is, and suppress a fluctuation in this system power. That is, the system stabilizing device 20 acts to detect a power flow at the point of interconnection between the distribution system (microgrid) 10 and the power system 1 and render fluctuations in the power flow gentle.

Under abnormal conditions where a breakdown occurs in the power system 1, on the other hand, the circuit breaker 2 is in a shut-off state, and the system stabilizing device 20 makes a "self-supporting run", a run performed with the distribution system 10 being cut off from the power system 1. During the self-supporting run, electric power is supplied to the load 12 by the dispersed generation plant 11 and the system stabilizing device 20.

During this self-supporting run, the movable contact 23a of the change-over switch 23 is thrown to the B side as indicated by a solid line in FIG. 7. As a result, the gate signal g obtained under control of the self-contained control unit 21 is fed to the power converter 26 to actuate the power converter 26.

During the above self-supporting run, the system stabilizing device 20 detects the system voltage Vs within the distribution system 10, and performs a compensating action so that the voltage amplitude and frequency of this system voltage Vs become stable. That is, the system stabilizing device 20 detects an excess or deficiency in the power within the distribution system (microgrid) 10, and exercises input or output control over the power such that surplus power is charged into the direct current charging unit 27 when the power within the microgrid 10 is greater than the load power, and the charged power is outputted when the load power is insufficient.

Details of the actions of the system stabilizing device 20 during the self-supporting run will be described by reference to FIG. 8.

During the self-supporting run, power is supplied from the dispersed generation plant 11 to the load 12. When the power load sharply increases at this time, the torque of the generator becomes insufficient for the load power, so that the number of revolutions decreases to lower the frequency of the voltage.

Governor control for maintaining the frequency of the output voltage at a constant value is applied to the internal combustion engine type power generation equipment. However, governor control is slow in response, so that if the load sharply increases, a decrease in the frequency lasting for several seconds or so occurs. As noted here, a load change (sharp increase in load) causes a great change to the frequency. According to this change, other power generation equipment within the microgrid 10 also increases in load, and governor control is performed for the other power generation equipment as well. It follows that governor control is exercised in a plurality of power generation equipment. If such a plurality of governor controls interfere with each other, oscillations, etc. occur in the system voltage, rendering power supply from the dispersed generation plant 11 to the load 12 unstable.

Under this situation, upon detection of a decrease in the frequency of the system voltage Vs, the system stabilizing device 20 outputs an active power to assist governor control of the internal combustion engine type power generation equipment, keeping a decrease in frequency to a minimum.

During the self-supporting run, moreover, power is supplied from the dispersed generation plant 11 to the load 12. When the load increases, a voltage drop in the system voltage Vs is caused by an armature reaction due to armature inductance LG within the generator of the power generation equipment.

AVR (automatic voltage regulating) control for maintaining the output voltage at a constant value is applied to the internal combustion engine type power generation equipment. However, AVR control is slow in response, so that if the load sharply increases, a decrease in the voltage lasting for several seconds or so occurs. As noted here, a load change or fluctuation causes a great change to the voltage.

Under this situation, upon detection of a voltage drop in the system voltage Vs, the system stabilizing device 20 outputs a reactive power, thus acting as a capacitor load, to cancel out the voltage drop in the armature inductance LG, thereby suppressing the voltage drop in the system voltage Vs.

By performing the above-mentioned two types of actions, the system stabilizing device 20 suppresses fluctuations in the frequency and amplitude (voltage value) of the system voltage Vs to improve power quality.

By further reference to FIG. 8, explanations will be offered for the configurations and actions of respective functional blocks which act during the self-supporting run among the respective functional blocks of the system stabilizing device 20.

A zero-crossing detecting unit 40 takes in the system voltage Vs detected by the voltage detector 29, and outputs a zero-crossing signal Z showing the interval between the zero-crossings of its sinusoidal waveform. A frequency converting unit 41 outputs a frequency signal ωs showing the frequency of the system voltage Vs based on the zero-crossing signal Z.

A fluctuation detecting block 42 determines the fluctuation component Cωs of the frequency signal ωs, and this fluctuation component Cωs is integrated by an integrator 43 to determine an active current command $I_{refd}$.

A voltage amplitude detecting unit 44 takes in the system voltage Vs detected by the voltage detector 29, and outputs a voltage amplitude signal |Vs| showing its voltage value.

A fluctuation detecting block 45 determines the fluctuation component C|Vs| of the voltage amplitude signal |Vs|, and this fluctuation component C|Vs| is multiplied by a predetermined gain by a proportional computing unit 46 to determine a reactive current command $I_{refq}$.

A PLL (phase-locked loop) circuit 50 is composed of a PLL computing unit 51, an adder 52, and an integrator 53.

This PLL circuit 50 outputs a control reference phase θ. The PLL computing unit 51 receives the zero-crossing signal Z and the control reference phase θ, and outputs a frequency difference Δωs. The adder 52 adds the frequency difference Δωs and a reference angular frequency ωs*, and the resulting sum Δωs+ωs) is integrated by the integrator 53 to output the control reference phase θ.

With this control reference phase θ as a phase reference, the transforming actions of a dq transformer 60 and a dq inverse transformer 65 to be described later are performed.

The dq transformer 60 carries out dq transformation of the converter current $I_{inv}$ detected by the current detector 30 to output the active component $I_{invd}$ of the converter current and the reactive component $I_{invq}$ of the converter current.

A subtracter 61 outputs the active component Δd of a current deviation which is a deviation between the active current command $I_{refd}$ and the active component $I_{invd}$ of the converter current. A current control unit (ACR) 62 performs the PI (proportional plus integral) computation of the active component Δd of the current deviation to output an active voltage command Vd.

A subtracter 63 outputs the reactive component Δq of a current deviation which is a deviation between the reactive current command $I_{refq}$ and the reactive component $I_{invq}$ of the converter current. A current control unit (ACR) 64 performs the PI (proportional plus integral) computation of the reactive component Δq of the current deviation to output a reactive voltage command Vq.

The dq inverse transformer 65 carries out the dq inverse transformation of the active voltage command Vd and the reactive voltage command Vq to output a voltage command V*.

The PWM (pulse width modulation) modulator 25 PWM-modulates the voltage command V* to produce the gate signal g, and the power converter 26 acts in response to this gate signal g.

As a result, when the frequency signal ωs declines, power compensation is made such that active power is outputted from the power converter 26, or when the voltage amplitude signal |Vs| declines, power compensation is made such that reactive power is outputted from the power converter 26.

A fluctuation detecting block 70 and a fluctuation detecting block 80, which can be used as the fluctuation detecting blocks 42, 45 (see FIG. 8), will be described by reference to FIGS. 9 and 10.

The fluctuation detecting block 70 shown in FIG. 9 can be used as the fluctuation detecting blocks 42, 45 (see FIG. 8).

The fluctuation detecting block 70 is composed of a low-pass filter 71, a low-pass filter 72, a subtracter 73, an amplifier 74, and a rating limiter 75.

The pass band frequency of the fluctuation detecting block 70 is determined by filtering characteristics required of the fluctuation detecting block 42 or the fluctuation detection block 45.

The low-pass filter 71 is a filter having first order lag characteristics, whose time constant is set to be the time constant T1. The time constant T1 is a time constant which has been determined for the purpose of noise removal.

The low-pass filter 72 is a filter having first order lag characteristics, whose time constant is set to be the time constant T2. The time constant T2 is a time constant which has been determined for the purpose of setting the time for detecting fluctuations.

When receiving an input signal (frequency signal ωs or voltage amplitude signal |Vs|), both filters 71 and 72 utilize their filtering characteristics to filter the input signal.

The subtracter 73 outputs a fluctuation component obtained by subtracting an output signal of the low-pass filter 72 from an output signal of the low-pass filter 71.

The fluctuation component outputted from the subtracter 73 is amplified by the amplifier 74. That is, −G as a negative gain has been set in the amplifier 74, and the fluctuation component is multiplied by −G.

Further, the fluctuation component amplified by the amplifier 74 is outputted after passage through the rating limiter 75. Thus, the upper limit value and lower limit value of its signal value (command value) are limited to the rated value, and then outputted.

The active current command $I_{refd}$ and the reactive current command $I_{refq}$ are determined based on the signals (fluctuation components Cω, C|Vs|) outputted from the rating limiter 75 (see FIG. 8).

That is, when the fluctuation detecting block 70 is used as the fluctuation detecting block 42, the active current command $I_{refd}$ is determined by integrating the signal (fluctuation component Cωs) outputted from the rating limiter 75. When the fluctuation detecting block 70 is used as the fluctuation detecting block 45, the reactive current command $I_{refq}$ is determined by multiplying the signal (fluctuation component C|Vs|) outputted from the rating limiter 75 by a predetermined gain.

The fluctuation detecting block 80 shown in FIG. 10 can be used as the fluctuation detecting blocks 42, 45 (see FIG. 8).

The fluctuation detecting block 80 is composed of a low-pass filter 81, a limiter 82, a delay circuit 83, a first subtracter 84, a second subtracter 85, an adder 86, an amplifier 87, and a rating limiter 88.

The pass band frequency of the fluctuation detecting block 80 is determined by filtering characteristics required of the fluctuation detecting block 42 or the fluctuation detecting block 45.

The low-pass filter 81 is a filter having first order lag characteristics, whose time constant is set to be the time constant T1. The time constant T1 is a time constant which has been determined for the purpose of noise removal.

When receiving an input signal (frequency signal ωs or voltage amplitude signal |Vs|), the low-pass filter 81 utilizes its filtering characteristics to filter the input signal.

The limiter 82 has limiting characteristics defined as ±(X/T3)Ts.

T3 represents a cushioning time set at an arbitrary duration, Ts represents one sampling period, and X represents a limiting value.

This limiter 82 limits the amount of change for one sampling period Ts. When the signal value of the signal inputted to the limiter 82 is a value between +X (upper limiting value) and −X (lower limiting value), the limiter 82 holds the signal value of the input signal as such, and outputs it. When the signal value of the signal inputted to the limiter 82 is above +X (upper limiting value), the limiter 82 allows the value to increase with a constant gradient for a predetermined time, and then limits the value to +X. When the signal value of the signal inputted to the limiter 82 is below −X (lower limiting value), the limiter 82 allows the value to decrease with a constant gradient for a predetermined time, and then limits the value to −X.

The delay circuit 83 has the properties of delaying the inputted signal by one sampling period Ts and outputting the delayed signal. This delay circuit 83 can be constructed, for example, by a Z transformation circuit having such properties as to show $Z^{-1}$.

The subtracter 84 performs subtraction between the output signal of the filter 81 having the first order lag characteristics and the output signal of the delay circuit 83, and sends the resulting difference signal to the limiter 82.

That is, the output signal of the delay circuit 83 is provided as negative feedback at the stage preceding the limiter 82.

The adder 86 adds the signal outputted from the limiter 82 and the signal outputted from the delay circuit 83, and outputs the sum.

That is, the output signal of the delay circuit 83 is provided as positive feedback at the stage succeeding the limiter 82.

The delay circuit 83 delays the output signal of the adder 86 by one sampling period Ts, and outputs the delayed signal.

As described above, the signal outputted from the delay circuit 83 is provided as negative feedback at the stage preceding the limiter 82, and is provided as positive feedback at the stage succeeding the limiter 83. Thus, the signal status is as follows:

The output of the subtracter 84 is "the present sampled value−the value after limiter processing performed one sampling period previously".

Thus, if the signal value inputted from the filter 81 to the subtracter 84 is +X or less, but −X or more, the signal value outputted from the limiter 82 is 0.

If the signal value inputted from the filter 81 to the subtracter 84 is above +X, but below −X, on the other hand, the signal value outputted from the limiter 82 is a value whose upper limit value and lower limit value are restricted by the limiting values (+X, −X).

The output of the adder 86 is "the output of the limiter+the value after limiter processing performed one sampling period previously".

Thus, if the signal value inputted from the filter 81 to the subtracter 84 is above +X, but below −X, the signal value outputted from the adder 86 linearly increases. That is, the value of the signal outputted from the adder 86 varies (increases or decreases) stepwise by the magnitude of the limiting value (+X or −X) for each sampling period Ts.

The subtracter 85 performs subtraction between the output signal of the low-pass filter 81 having the first order lag characteristics and the output signal of the adder 86, and outputs the difference. A fluctuation component included in the input signal is outputted from the subtracter 85.

The fluctuation component outputted from the subtracter 85 is amplified by the amplifier 87. That is, −G as a negative gain has been set in the amplifier 87, and the fluctuation component is multiplied by −G.

Further, the fluctuation component amplified by the amplifier 87 is outputted after passage through the rating limiter 88. Thus, the upper limit value and lower limit value of its signal value (command value) are limited to the rated value, and then outputted.

The active current command $I_{refd}$ and the reactive current command $I_{refq}$ are determined based on the signals (fluctuation components Cωs, C|Vs|) outputted from the rating limiter 88 (see FIG. 8).

That is, when the fluctuation detecting block 80 is used as the fluctuation detecting block 42, the active current command $I_{refd}$ is determined by integrating the signal (fluctuation component Cωs) outputted from the rating limiter 88. When the fluctuation detecting block 80 is used as the fluctuation detecting block 45, the reactive current command $I_{refq}$ is determined by multiplying the signal (fluctuation component C|Vs|) outputted from the rating limiter 88 by a predetermined gain.

PRIOR ART DOCUMENTS

Patent Document
Patent Document 1: JP-A-10-14251

SUMMARY OF THE INVENTION

Problems to be Solved by the Invention

As stated above, the system stabilizing device 20, during the self-supporting run, detects the fluctuation in the frequency of the system voltage Vs and performs feedback computation, thereby setting the active power which is outputted by the power converter 26.

However, the fluctuation in the frequency of the system voltage Vs is caused not only by a fluctuation in load, but also by the execution of feedback control by generator governor control.

Thus, when a frequency increase occurs upon governor control of the generator, the system stabilizing device 20 may misconceive that the frequency increase has occurred because of a decrease in load, and may absorb an active power. Such an action of the system stabilizing device 20 (the action of absorbing the active power) results in the action of impeding the governor control of the generator (outputting of an active power). This is a state where the system stabilizing device 20 and the generator interfere with each other.

FIGS. 11(a) to 11(c) show compensating waveforms when the fluctuation detecting block 70 shown in FIG. 9 was used as the fluctuation detecting block 42. FIGS. 12(a) to 12(c) show compensating waveforms when the fluctuation detecting block 80 shown in FIG. 10 was used as the fluctuation detecting block 42.

As shown in FIG. 11(a) and FIG. 12(a), when the load sharply increases and a stepped load current $I_L$ begins to flow suddenly, the frequency signal ωs decreases owing to a load fluctuation (a sharp increase in load) during the term TA, and the frequency signal ωs is recovering (increasing) during the term TB following the term TA upon governor control, as shown in FIG. 11(b) and FIG. 12(b).

As shown in FIG. 11(c) and FIG. 12(c), a current command $I_{ref}$ of a positive value for outputting an active power is outputted during the term TA. During the term TB, the frequency signal ωs is increasing, so that the current command $I_{ref}$ of a negative value for absorbing the active power is outputted.

Hence, even if the generator outputs active power by governor control, the power converter 26 acts to absorb the active power, with the result that the system stabilizing device 20 and the generator interfere with each other.

In FIGS. 11(c) and 12(c) a shaded area for the term TB corresponds to the active power absorbed by the power converter 26.

To prevent such a situation in which the system stabilizing device 20 and the generator interfere, a judging function for judging whether the frequency fluctuation is due to a load fluctuation or attributed to the governor control of the generator has to be added. Addition of such a judging function would complicate the device.

Furthermore, in control for detecting a fluctuation in the voltage amplitude to compensate for the reactive power, it cannot be judged whether the amplitude fluctuation is due to a load fluctuation or due to the AVR (automatic voltage regulating) control of the generator. Thus, a similar problem arises.

That is, during the self-supporting run, the system stabilizing device 20 detects the fluctuation in the voltage amplitude of the system voltage Vs to perform feedback computation, thereby setting the reactive power which is outputted by the power converter 26.

However, the fluctuation in the voltage amplitude of the system voltage Vs occurs not only when the load fluctuates, but also when feedback control by the AVR control of the generator is exercised.

Thus, when an increase in the voltage amplitude occurs upon AVR control of the generator, the system stabilizing device 20 may misconceive that the voltage amplitude increase has occurred because of a decrease in load, and may absorb a reactive power. Such an action of the system stabilizing device 20 (the action of absorbing the reactive power) results in the action of impeding the AVR control of the generator (the action of increasing the generator voltage). This is a state where the system stabilizing device 20 and the generator interfere with each other.

The present invention has been accomplished in the light of the above-described conventional technologies. It is an object of the invention to provide a system stabilizing device capable of exercising system stabilizing control, without interfering with the governor control or AVR (automatic voltage regulating) control of the generator.

Means for Solving the Problems

A constitution of the present invention for solving the above problems is a system stabilizing device provided in a distribution system to which a dispersed generation plant and a load are connected, the system stabilizing device having a control mode during a self-supporting run, which is a control mode for compensating for an active power to be supplied to the distribution system as a frequency of a system voltage of the distribution system fluctuates, and also for compensating for a reactive power to be supplied to the distribution system as a voltage amplitude of the system voltage of the distribution system fluctuates, the system stabilizing device having a self-contained control unit which, in accordance with a fluctuation in the frequency of the system voltage, outputs an active current command for suppressing the fluctuation in the frequency, and in accordance with a fluctuation in the voltage amplitude of the system voltage, outputs a reactive current command for suppressing the fluctuation in the voltage amplitude, and a power converter which performs a converting action and an inverting action in accordance with a gate signal determined based on the active current command and the reactive current command, wherein the self-contained control unit has a first fluctuation detecting block for outputting a fluctuation component (Cωs) conformed to the frequency fluctuation of the system voltage, and a second fluctuation detecting block for outputting a fluctuation component (C|Vs|) conformed to the voltage amplitude fluctuation of the system voltage, when a time constant set for noise removal is set to be T1, and a time constant determined for setting a fluctuation detection time is set to be T2, the first and second fluctuation detecting blocks are each composed of a first low-pass filter having first order lag characteristics with a time constant of T1, a second low-pass filter having first order lag characteristics with a constant of T2, a subtracter for performing a subtraction between an output signal of the first low-pass filter and an output signal of the second low-pass filter, and an interference action inhibiting unit, and the interference action inhibiting unit changes the time constant T2 of the first fluctuation detecting block to a small value (i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or (ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and changes the time constant T2 of the second fluctuation detecting block to a small value (iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or (iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

Another constitution of the present invention is the above system stabilizing device, wherein the time constant T1 set for noise removal and the time constant T2 determined for setting the fluctuation detection time are set in each of the first and second fluctuation detecting blocks, the first and second fluctuation detecting blocks each perform computations with use of computing programs to carry out first order lag filtering of the signal inputted to the fluctuation detecting block, with a time constant as T1, to determine a first filter signal, carry out first order lag filtering of the signal inputted to the fluctuation detecting block, with a time constant as T2, to determine a second filter signal, and subtract the second filter signal from the first filter signal to determine a fluctuation component, the first fluctuation detecting block performs the computations with use of the computing programs to change the time constant T2 of the first fluctuation detecting block to a small value (i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or (ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and the second fluctuation detecting block performs the computations with use of the computing programs to change the time constant T2 of the second fluctuation detecting block to a small value (iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or (iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

Another constitution of the present invention is a system stabilizing device provided in a distribution system to which a dispersed generation plant and a load are connected, the system stabilizing device having a control mode during a self-supporting run, which is a control mode for compensating for an active power to be supplied to the distribution system as a frequency of a system voltage of the distribution system fluctuates, and also for compensating for a reactive power to be supplied to the distribution system as a voltage amplitude of the system voltage of the distribution system fluctuates, the system stabilizing device having a self-contained control unit which, in accordance with a fluctuation in the frequency of the system voltage, outputs an active current command for suppressing the fluctuation in the frequency, and in accordance with a fluctuation in the voltage amplitude of the system voltage, outputs a reactive current command for suppressing the fluctuation in the voltage amplitude, and a power converter which performs a converting action and an inverting action in accordance with a gate signal determined based on the active current command and the reactive current command, wherein the self-contained control unit has a first fluctuation detecting block for outputting a fluctuation component (Cωs) conformed to the frequency fluctuation of the system voltage, and a second fluctuation detecting block for outputting a fluctuation component (C|Vs|) conformed to the voltage amplitude fluctuation of the system voltage, when a time constant set for noise removal is T1, an arbitrarily set cushioning time is T3, one sampling period is Ts, and X is a limiting value, the first and second fluctuation detecting blocks are each composed of a low-pass filter having first order lag characteristics with a time constant of T1, a limiter having limiting characteristics defined as ±(X/T3)Ts, a delay circuit for delaying an inputted signal by one sampling period Ts and outputting the delayed signal, a first subtracter, a second subtracter, an adder, and an interference action inhibiting unit, the first subtracter performs a subtraction between an output signal of the low-pass filter having the first order lag characteristics and an output signal of the delay circuit, and feeds a resulting difference to the limiter, the adder adds an output signal of the limiter and the output signal of the delay circuit, and outputs a resulting sum, the delay circuit delays an output signal of the adder by one sampling period Ts, and outputs the delayed signal, the second subtracter performs a subtraction between the output signal of the low-pass filter having the first order lag characteristics and the output signal of the adder, and outputs a resulting difference, and the interference action inhibiting unit changes the cushioning time T3 of the limiter provided in the first fluctuation detecting block to a small value (i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or (ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and changes the cushioning time T3 of the limiter provided in the second fluctuation detecting block to a small value (iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or (iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

Another constitution of the present invention is the above system stabilizing device, wherein the time constant T1 set for noise removal, the arbitrarily set cushioning time T3, the one sampling period Ts, and the limiting value X are set in each of the first and second fluctuation detecting blocks, the first and second fluctuation detecting blocks each perform computations with use of computing programs to carry out first order lag filtering of the input signal inputted to the fluctuation detecting block, with a time constant as T1, to determine a filter signal, subtract the delayed signal from the filter signal to determine a subtraction signal, perform a limiting operation on the subtraction signal by the limiting characteristics defined as ±(X/T3)Ts to determine a limit signal, add the limit signal and the delayed signal to determine an addition signal, delay the addition signal by the one sampling period Ts to form the delayed signal, and subtract the addition signal from the filter signal to determine a fluctuation component, the first fluctuation detecting block performs the computations with use of the computing programs to change the cushioning time T3 of the limiter provided in the first fluctuation detecting block to a small value (i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or (ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and the second fluctuation detecting block performs the computations with use of the computing programs to change the cushioning time T3 of the limiter provided in the second fluctuation detecting block to a small value (iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or (iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

EFFECTS OF THE INVENTION

According to the present invention, the system stabilizing device does not misconceive that the frequency fluctuation due to the governor control of the generator or the voltage amplitude fluctuation due to AVR (automatic voltage regulating) control of the generator has been caused by a load fluctuation. Thus, the system stabilizing device can exercise optimal system stabilizing control, without interfering with the governor control or AVR control.

MODE FOR CARRYING OUT THE INVENTION

A mode for carrying out the present invention will be described in detail based on embodiments of the invention.

Embodiment 1

Figure 1:
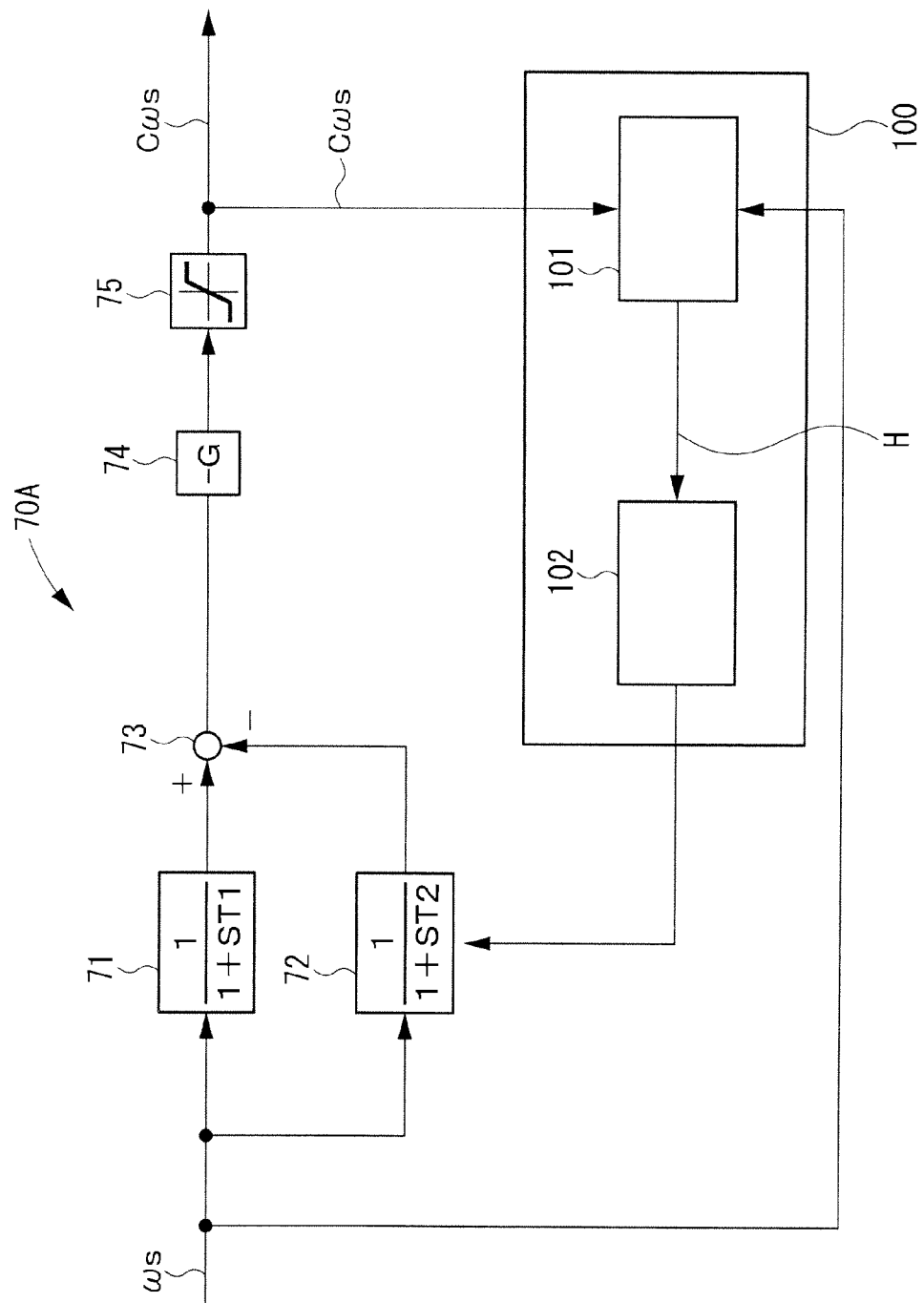
[FIG. 1] is a circuit configuration drawing showing a fluctuation detecting block according to Embodiment 1 of the present invention.
Figure 9:
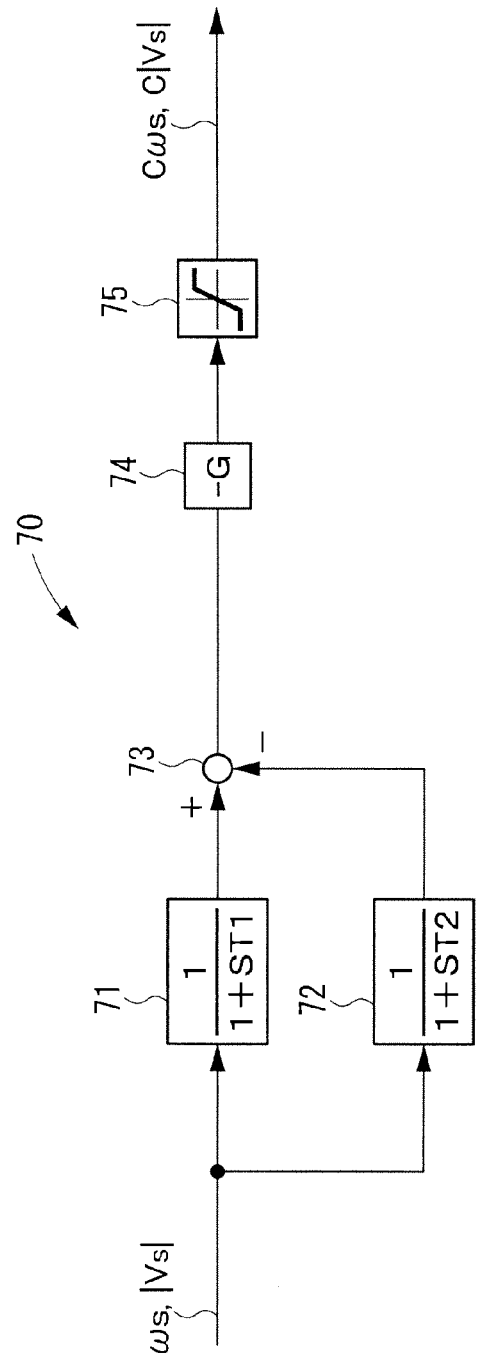
[FIG. 9] is a circuit configuration drawing showing a conventional fluctuation detecting block.

FIG. 1 shows a fluctuation detecting block 70A according to Embodiment 1 of the present invention. This fluctuation detecting block 70A has an interference action inhibiting unit 100 further added to the configuration of the fluctuation detecting block 70 shown in FIG. 9.

Thus, the interference action inhibiting unit 100 will be mainly described, with the same parts as those in the fluctuation detecting block 70 being assigned the same numerals as in the fluctuation detecting block 70, and a duplicate explanation being omitted.

Figure 8:
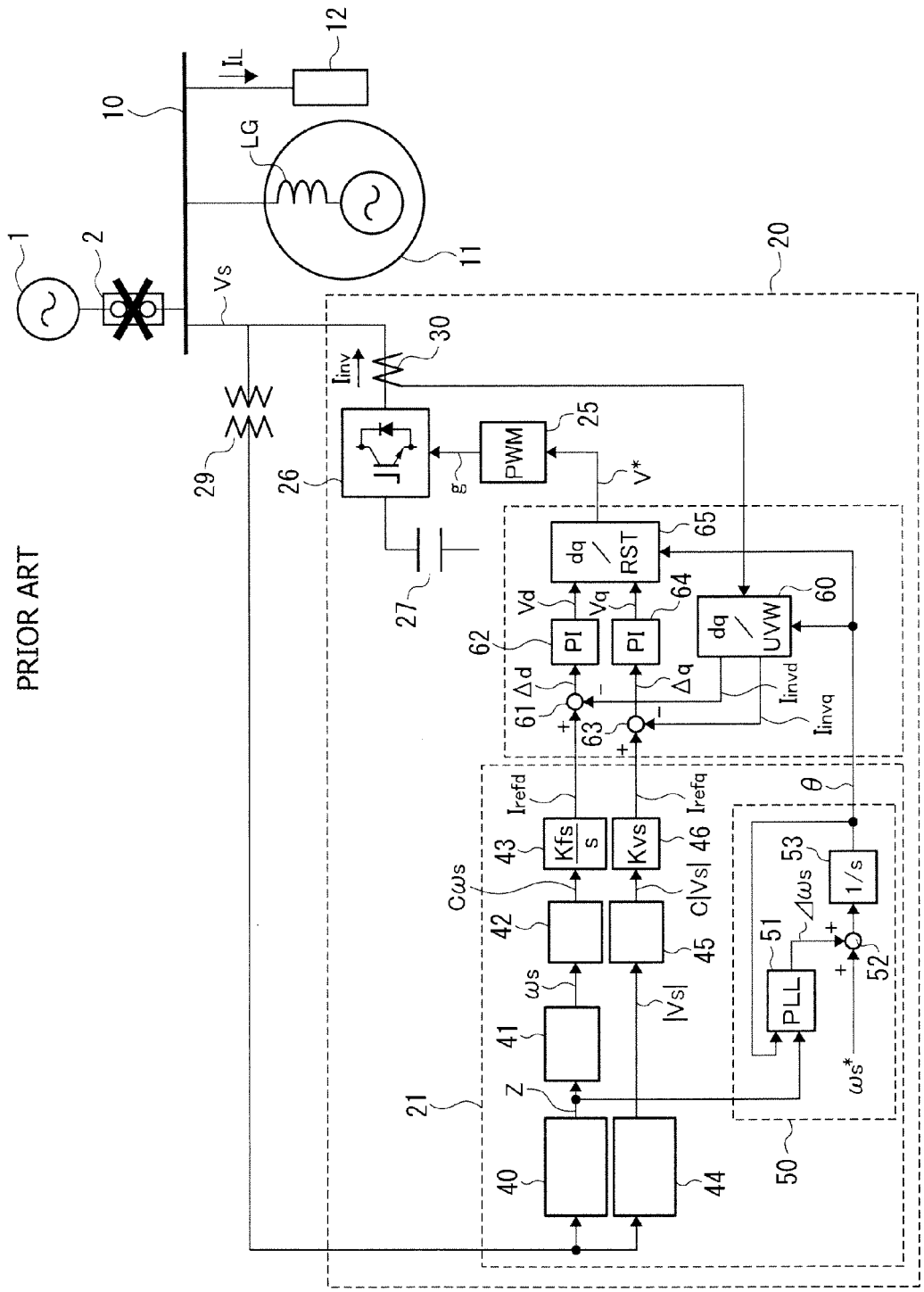
[FIG. 8] is a circuit configuration drawing showing the microgrid equipped with the system stabilizing device.

In this embodiment, the fluctuation detecting block 70A is applied to the fluctuation detecting block 42 of the system stabilizing device 20 shown in FIG. 8, which is designed to output the fluctuation component Cωs as the optimal value, without interfering with the governor control of the generator.

The inference action inhibiting unit 100 has an interference action judgment block 101, and a time constant changing block 102.

The frequency signal ωs and the fluctuation component Cωs of the frequency signal ωs are inputted to the interference action judgment block 101. By integrating the fluctuation component Cωs, the active current command $I_{refd}$ is obtained.

The interference action judgment block 101 determines or judges whether the system stabilizing action of the system stabilizing device 20 (see FIG. 8) and the governor control action of the generator interfere with each other.

Concretely, the following judgment conditions (i) and (ii) have been set and, if either of the judgment conditions (i) and (ii) is met, it is judged that the system stabilizing action of the system stabilizing device 20 and the governor control action of the generator interfere with each other.

(i) The frequency of the frequency signal ωs is smaller than a predetermined rated frequency, and the fluctuation component Cωs has a negative value or is negative.

(ii) The frequency of the frequency signal ωs is larger than the predetermined rated frequency, and the fluctuation component Cωs has a positive value or is positive.

If the fluctuation component Cωs is of a negative value, the power converter 26 acts to absorb the active power under the active current command $I_{refd}$ at this time. If the fluctuation component Cωs is of a positive value, the power converter 26 acts to release the active power under the active current command $I_{refd}$ at this time.

Depending on the circuit configuration, the positivity or negativity of the fluctuation component Cωs, and the active power absorbing or releasing action of the power converter 26 may be opposite to those mentioned above. In this embodiment, however, an explanation will be offered on the assumption that the above actions are performed.

Further, the interference action judgment block 101 outputs a time constant changing signal H when a state where the judgment condition (i) or (ii) is true continues for a predetermined set time. When a predetermined time (for example, a term longer than the term TB in FIGS. 2(a) to 2(c)) elapses after outputting this time constant changing signal H, the interference action judgment block 101 stops the outputting of the time constant changing signal H.

The reason why the time constant changing signal H is outputted after continuation of the judgment condition (i) or (ii) for the predetermined set time is that the occurrence of a malfunction due to noise or the like is prevented by doing so.

In the absence of the time constant changing signal H outputted from the interference action judgment block 101, the time constant changing block 102 maintains the time constant T2 set in the low-pass filter 72 as such.

In the presence of the time constant changing signal H outputted from the interference action judgment block 101, by contrast, the time constant changing block 102 changes the time constant of the low-pass filter 72 to a smaller value, for example, a tenth of T2.

When outputting of the time constant changing signal H from the interference action judgment block 101 is stopped, the time constant changing block 102 returns the time constant of the low-pass filter 72 to T2.

Compensating waveforms when the fluctuation detecting block 70A was used as the fluctuation detecting block 42 shown in FIG. 8 will be described by reference to FIGS. 2(a) to 2(c).

Figure 2:
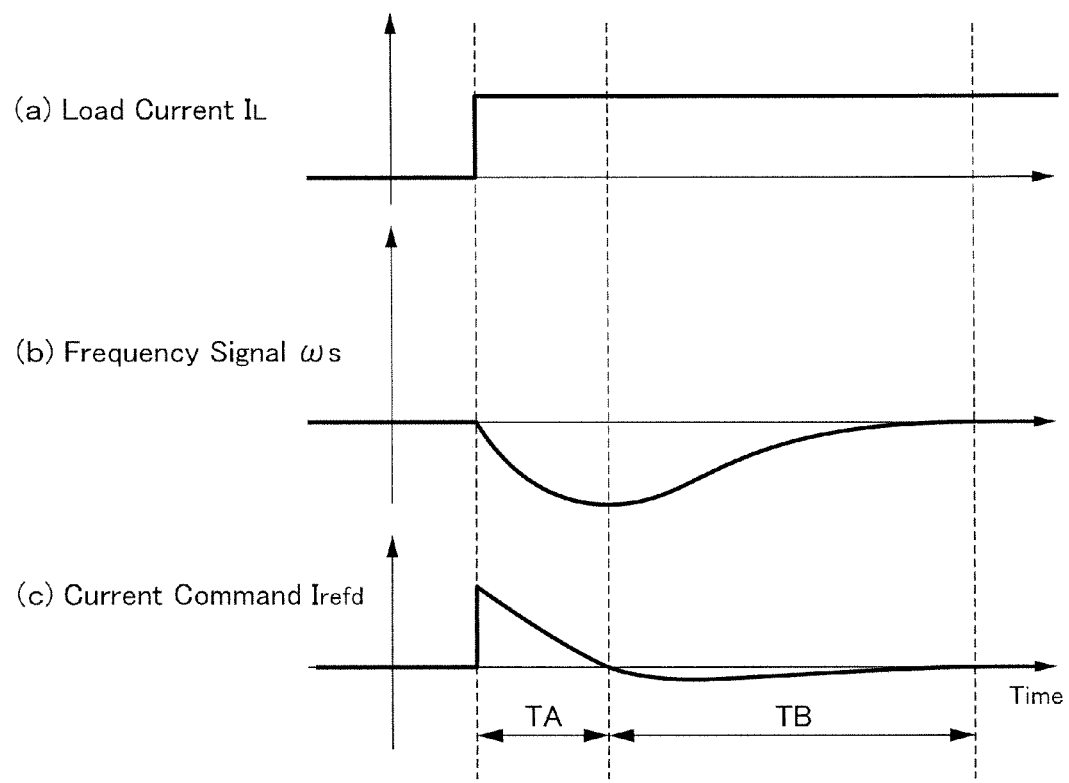
[FIGS. 2(a) to 2(c)] are characteristic charts showing compensating waveforms when the fluctuation detecting block of Embodiment 1 was used.

When the load sharply increases and a stepped load current $I_L$ begins to flow suddenly, as shown in FIG. 2(a), the frequency signal ωs decreases owing to a load fluctuation (a sharp increase in load) during the term TA, and the frequency signal ωs is recovering (increasing) during the term TB following the term TA upon governor control, as shown in FIG. 2(b).

As shown in FIG. 2(c), a current command $I_{ref}$ (fluctuation component Cωs) of a positive value for outputting an active power is outputted during the term TA. During the term TB, the frequency signal ωs is increasing, so that the current command $I_{ref}$ (fluctuation component Cωs) of a negative value for absorbing the active power is outputted.

During the term TA, the judgment condition (i) or (ii) does not hold true. During the term TB, on the other hand, the frequency of the frequency signal ωs is smaller than the rated frequency, and the fluctuation component Cωs is negative. Thus, the judgment condition (i) is fulfilled.

The interference action judgment block 101 outputs the time constant changing signal H when the state where the judgment condition (i) is true continues for the predetermined set time.

When the time constant changing signal H is outputted, the time constant changing block 101 changes the time constant of the low-pass filter 72 to a smaller value, for example, a tenth of T2.

When the time constant of the low-pass filter 72 becomes small in this manner, the value (absolute value) of the fluctuation component Cωs detected also becomes small, so that the value (absolute value) of the active current command Vd of a negative value, accordingly, the value (absolute value) of the current command $I_{refd}$ is decreased.

As a result, the action of the power converter 26 that absorbs the active power is inhibited. Thus, while the governor control action (action of outputting the active power) of the generator is performed, the action of absorbing the active power by the system stabilizing device 20 is inhibited. As noted here, interference between the governor control action and the system stabilizing action can be prevented.

The compensating waveforms in FIGS. 2(a) to 2(c) represent the characteristics when the load sharply increased. If the load sharply decreased, the waveforms in FIGS. 2(a) to 2(c) are waveforms whose positive and negative polarities were reversed.

In the case of such a sharp decrease in the load, the frequency of the frequency signal ωs is larger than the rated frequency, and the fluctuation component Cωs is positive, during the term TB. Thus, the judgment condition (ii) is fulfilled.

When the judgment condition (ii) is thus fulfilled, as when the judgment condition (i) is met, the interference action inhibiting unit 100 changes the time constant of the low-pass filter 72 to a smaller value, for example, a tenth of T2.

When the time constant T2 of the low-pass filter 72 becomes small in this manner, the value (absolute value) of the fluctuation component Cωs detected also becomes small, so that the value (absolute value) of the active current command Vd of a positive value, accordingly, the value (absolute value) of the current command $I_{refd}$ is decreased.

As a result, the action of the power converter 26 that releases the active power is inhibited. Thus, while the governor control action (action of absorbing the active power) of the generator is performed, the action of releasing the active power by the system stabilizing device 20 is inhibited. As noted here, interference between the governor control action and the system stabilizing action can be prevented.

Embodiment 2

Figure 3:
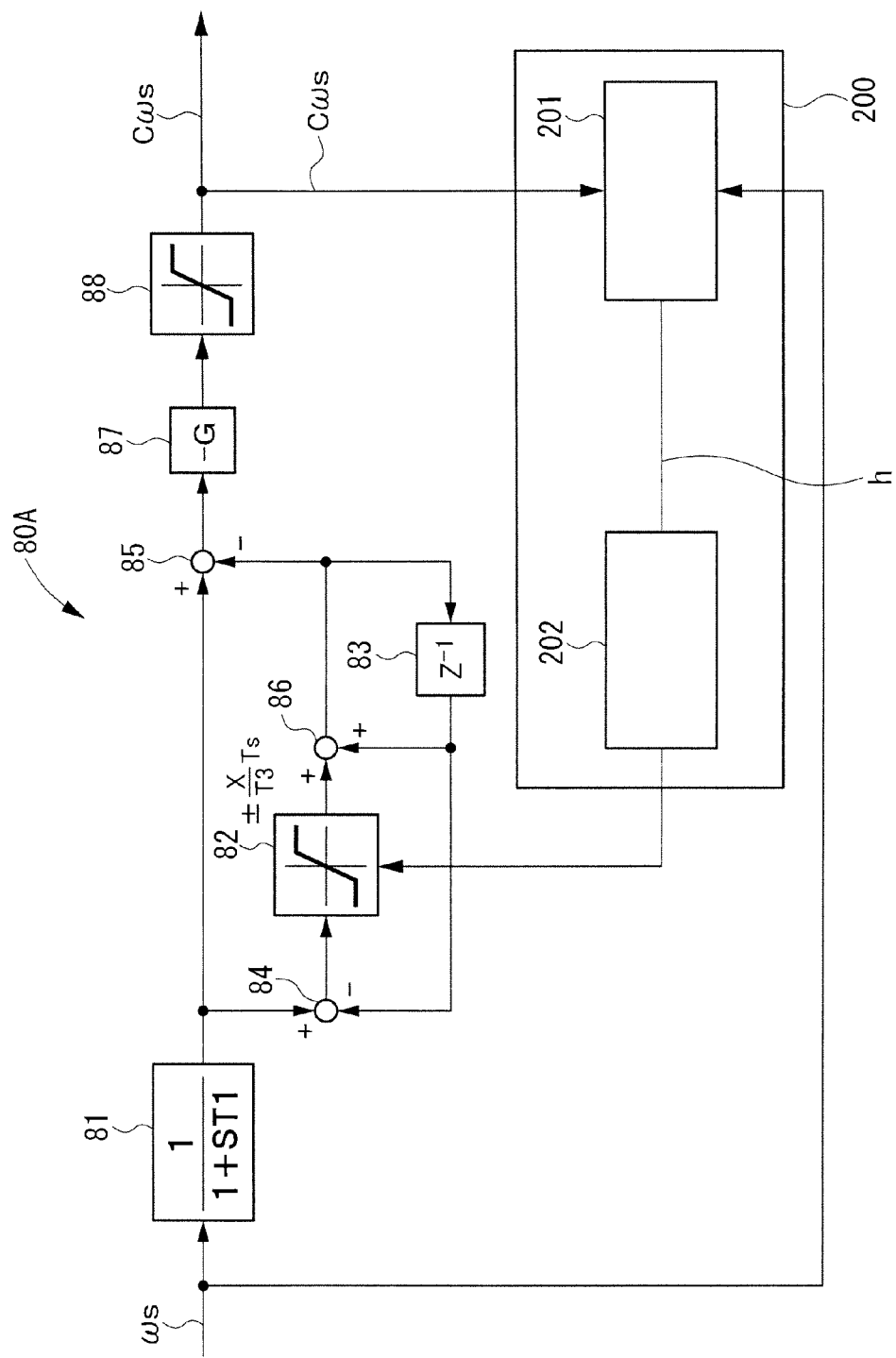
[FIG. 3] is a circuit configuration drawing showing a fluctuation detecting block according to Embodiment 2 of the present invention.
Figure 10:
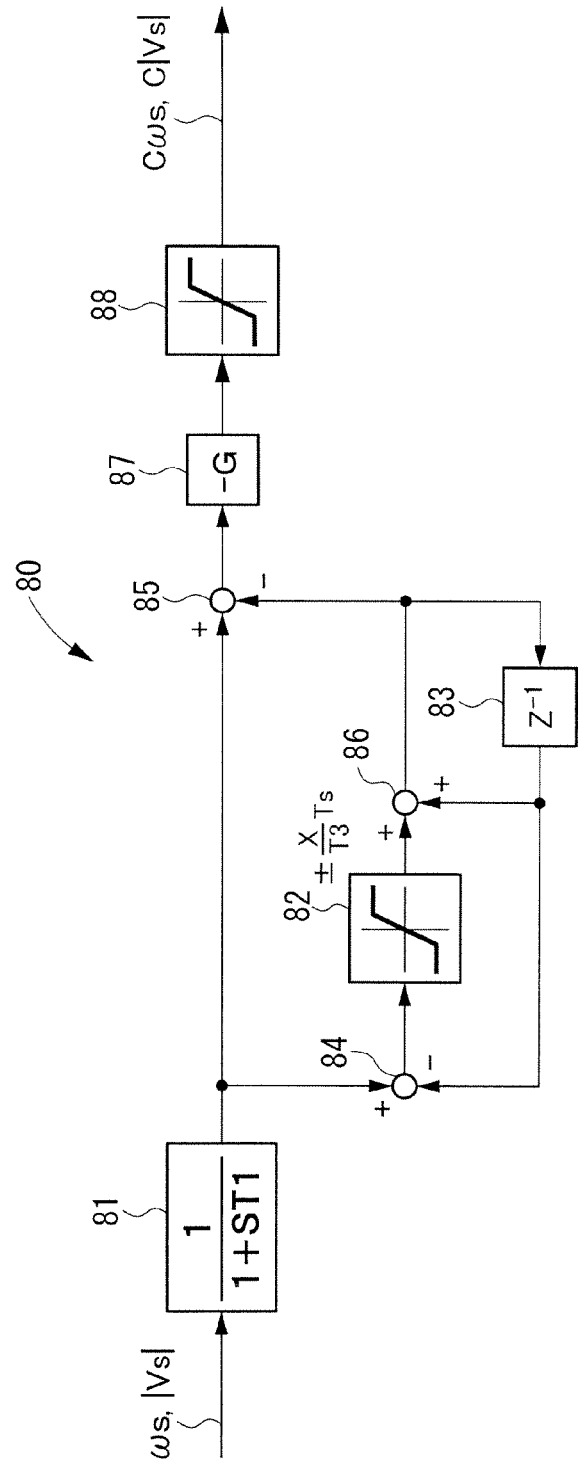
[FIG. 10] is a circuit configuration drawing showing a conventional fluctuation detecting block.
Figure 11:
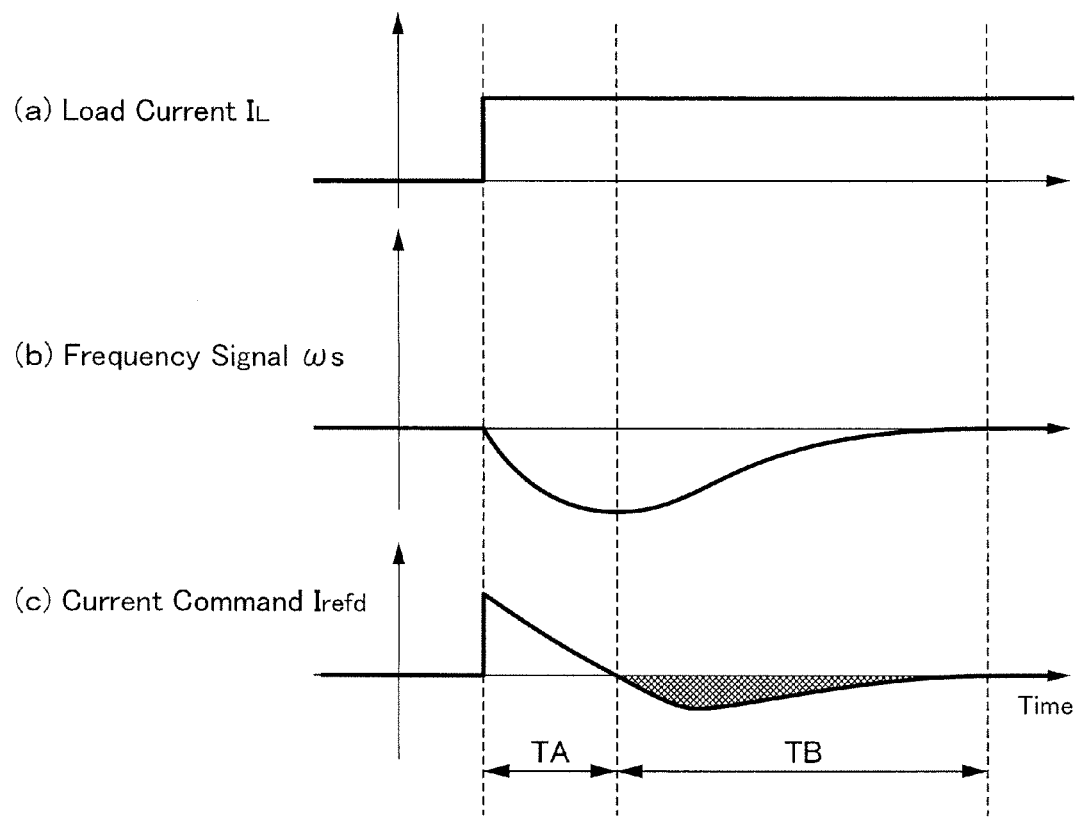
[FIGS. 11(a) to 11(c)] are characteristic charts showing compensating waveforms when the conventional fluctuation detecting block was used.
Figure 12:
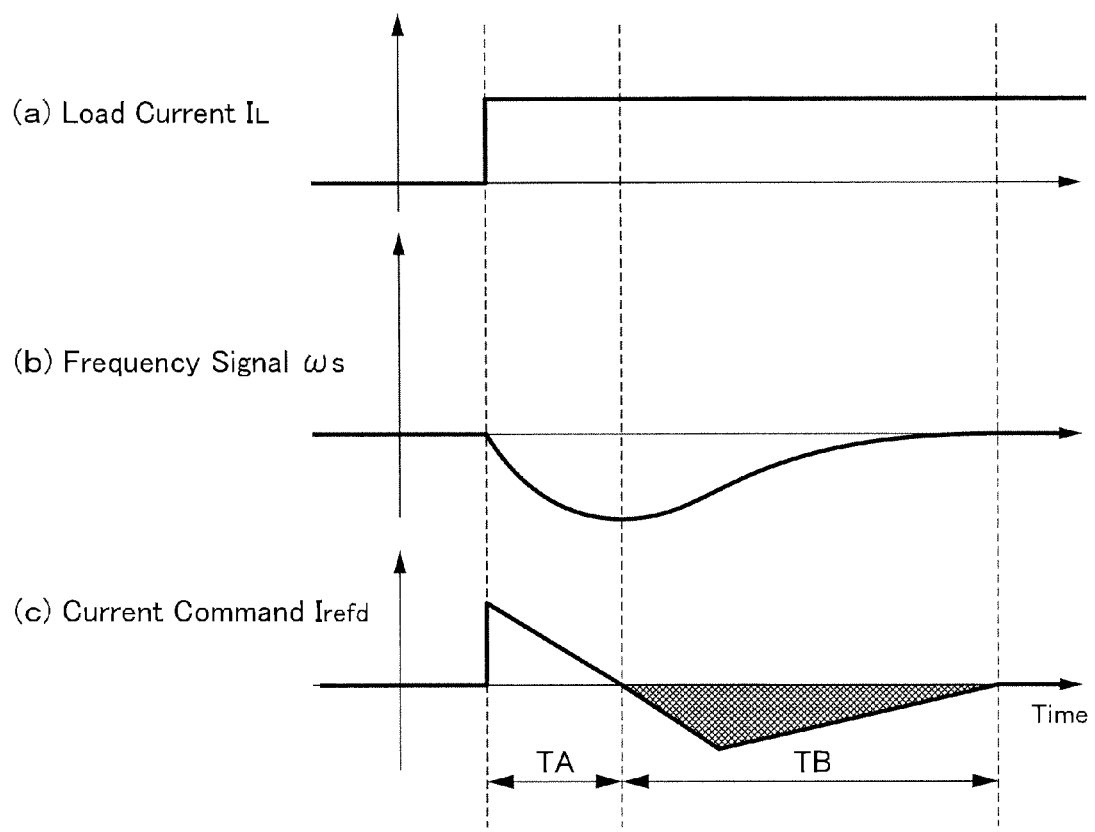
[FIGS. 12(a) to 12(c)] are characteristic charts showing compensating waveforms when the conventional fluctuation detecting block was used.

FIG. 3 shows a fluctuation detecting block 80A according to Embodiment 2 of the present invention. This fluctuation detecting block 80A has an interference action inhibiting unit 200 further added to the configuration of the fluctuation detecting block 80 shown in FIG. 10.

Thus, the interference action inhibiting unit 200 will be mainly described, with the same parts as those in the fluctuation detecting block 80 being assigned the same numerals as in the fluctuation detecting block 80, and a duplicate explanation being omitted.

In this embodiment, the fluctuation detecting block 80A is applied to the fluctuation detecting block 42 of the system stabilizing device 20 shown in FIG. 8, which is designed to output the fluctuation component Cωs as the optimal value, without interfering with the governor control of the generator.

The inference action inhibiting unit 200 has an interference action judgment block 201, and a cushioning time changing block 202.

The frequency signal ωs and the fluctuation component Cωs of the frequency signal ωs are inputted to the interference action judgment block 201. By integrating the fluctuation component Cωs, the active current command $I_{refd}$ is obtained.

The interference action judgment block 201 judges whether the system stabilizing action of the system stabilizing device 20 (see FIG. 8) and the governor control action of the generator interfere with each other.

Concretely, the following judgment conditions (i) and (ii) have been set and, if either of the judgment conditions (i) and (ii) is met, it is judged that the system stabilizing action of the system stabilizing device 20 and the governor control action of the generator interfere with each other.

(i) The frequency of the frequency signal ωs is smaller than a predetermined rated frequency, and the fluctuation component Cωs has a negative value or is negative.

(ii) The frequency of the frequency signal ωs is larger than the predetermined rated frequency, and the fluctuation component Cωs has a positive value or is positive.

If the fluctuation component Cωs is of a negative value, the power converter 26 acts to absorb the active power under the active current command $I_{refd}$ at this time. If the fluctuation component Cωs is of a positive value, the power converter 26 acts to release the active power under the active current command $I_{refd}$ at this time.

Depending on the circuit configuration, the positivity or negativity of the fluctuation component Cωs, and the active power absorbing or releasing action of the power converter 26 may be opposite to those mentioned above. In this embodiment, however, an explanation will be offered on the assumption that the above actions are performed.

Further, the interference action judgment block 201 outputs a cushioning time changing signal h when a state where the judgment condition (i) or (ii) is true continues for a predetermined set time. When a predetermined time (for example, a term longer than the term TB in FIGS. 4(a) to 4(c)) elapses after outputting this cushioning time changing signal h, the interference action judgment block 201 stops the outputting of the cushioning time changing signal h.

The reason why the cushioning time changing signal h is outputted after continuation of the judgment condition (i) or (ii) for the predetermined set time is that the occurrence of a malfunction due to noise or the like is prevented by doing so.

In the absence of the cushioning time changing signal h outputted from the interference action judgment block 201, the cushioning time changing block 202 maintains the time constant T3 set in the limiter 82 as such.

In the presence of the cushioning time changing signal h outputted from the interference action judgment block 201, by contrast, the cushioning time changing block 201 changes the cushioning time of the limiter 82 to a smaller value, for example, a fourth of T3.

When outputting of the cushioning time changing signal h from the interference action judgment block 201 is stopped, the cushioning time changing block 202 returns the cushioning time of the limiter 82 to T3.

Compensating waveforms when the fluctuation detecting block 80A was used as the fluctuation detecting block 42 shown in FIG. 8 will be described by reference to FIGS. 4(a) to 4(c).

Figure 4:
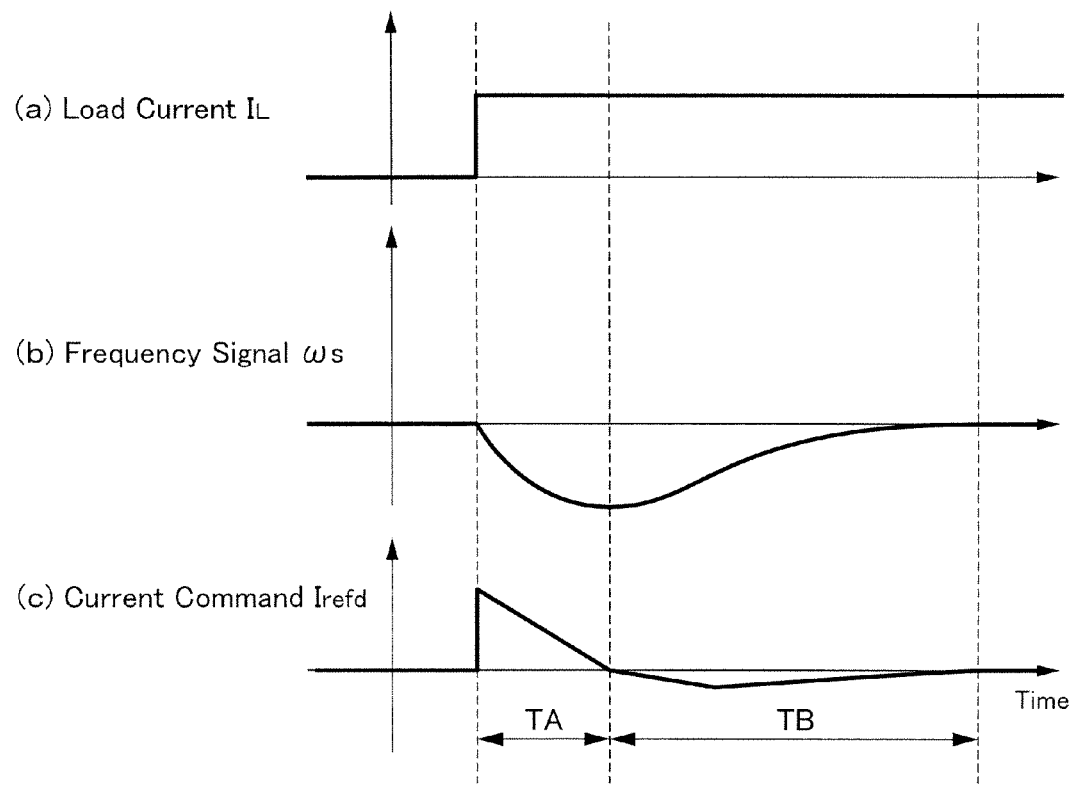
[FIGS. 4(a) to 4(c)] are characteristic charts showing compensating waveforms when the fluctuation detecting block of Embodiment 2 was used.

When the load sharply increases and a stepped load current $I_L$ begins to flow suddenly, as shown in FIG. 4(a), the frequency signal ωs decreases owing to a load fluctuation (a sharp increase in load) during the term TA, and the frequency signal ωs is recovering (increasing) during the term TB following the term TA upon governor control, as shown in FIG. 4(b).

As shown in FIG. 4(c), a current command $I_{ref}$ (fluctuation component Cωs) of a positive value for outputting an active power is outputted during the term TA. During the term TB, the frequency signal ωs is increasing, so that the current command $I_{ref}$ (fluctuation component Cωs) of a negative value for absorbing the active power is outputted.

During the term TA, the judgment condition (i) or (ii) does not hold true. During the term TB, on the other hand, the frequency of the frequency signal ωs is smaller than the rated frequency, and the fluctuation component Cωs is negative. Thus, the judgment condition (i) is fulfilled.

The interference action judgment block 201 outputs the cushioning time changing signal h when the state where the judgment condition (i) is true continues for the predetermined set time.

When the cushioning time changing signal h is outputted, the cushioning time changing block 201 changes the cushioning time of the limiter 82 to a smaller value, for example, a fourth of T3.

When the cushioning time of the limiter 82 becomes small in this manner, the value (absolute value) of the fluctuation component Cωs detected also becomes small, so that the value (absolute value) of the active current command Vd of a negative value, accordingly, the value (absolute value) of the current command $I_{refd}$ is decreased.

As a result, the action of the power converter 26 that absorbs the active power is inhibited. Thus, while the governor control action (action of outputting the active power) of the generator is performed, the action of absorbing the active power by the system stabilizing device 20 is inhibited. As noted here, interference between the governor control action and the system stabilizing action can be prevented.

The compensating waveforms in FIGS. 4(a) to 4(c) represent the characteristics when the load sharply increased. If the load sharply decreased, the waveforms in FIGS. 4(a) to 4(c) are waveforms whose positive and negative polarities were reversed.

In the case of such a sharp decrease in the load, the frequency of the frequency signal ωs is larger than the rated frequency, and the fluctuation component Cωs is positive, during the term TB. Thus, the judgment condition (ii) is fulfilled.

When the judgment condition (ii) is thus fulfilled, as when the judgment condition (i) is met, the interference action inhibiting unit 200 changes the cushioning time of the limiter 82 to a smaller value, for example, a tenth of T3.

When the cushioning time T3 of the limiter 82 becomes small in this manner, the value (absolute value) of the fluctuation component Cωs detected also becomes small, so that the value (absolute value) of the active current command Vd of a positive value, accordingly, the value (absolute value) of the current command $I_{refd}$ is decreased.

As a result, the action of the power converter 26 that releases the active power is inhibited. Thus, while the governor control action (action of absorbing the active power) of the generator is performed, the action of releasing the active power by the system stabilizing device 20 is inhibited. As noted here, interference between the governor control action and the system stabilizing action can be prevented.

Embodiment 3

Figure 5:
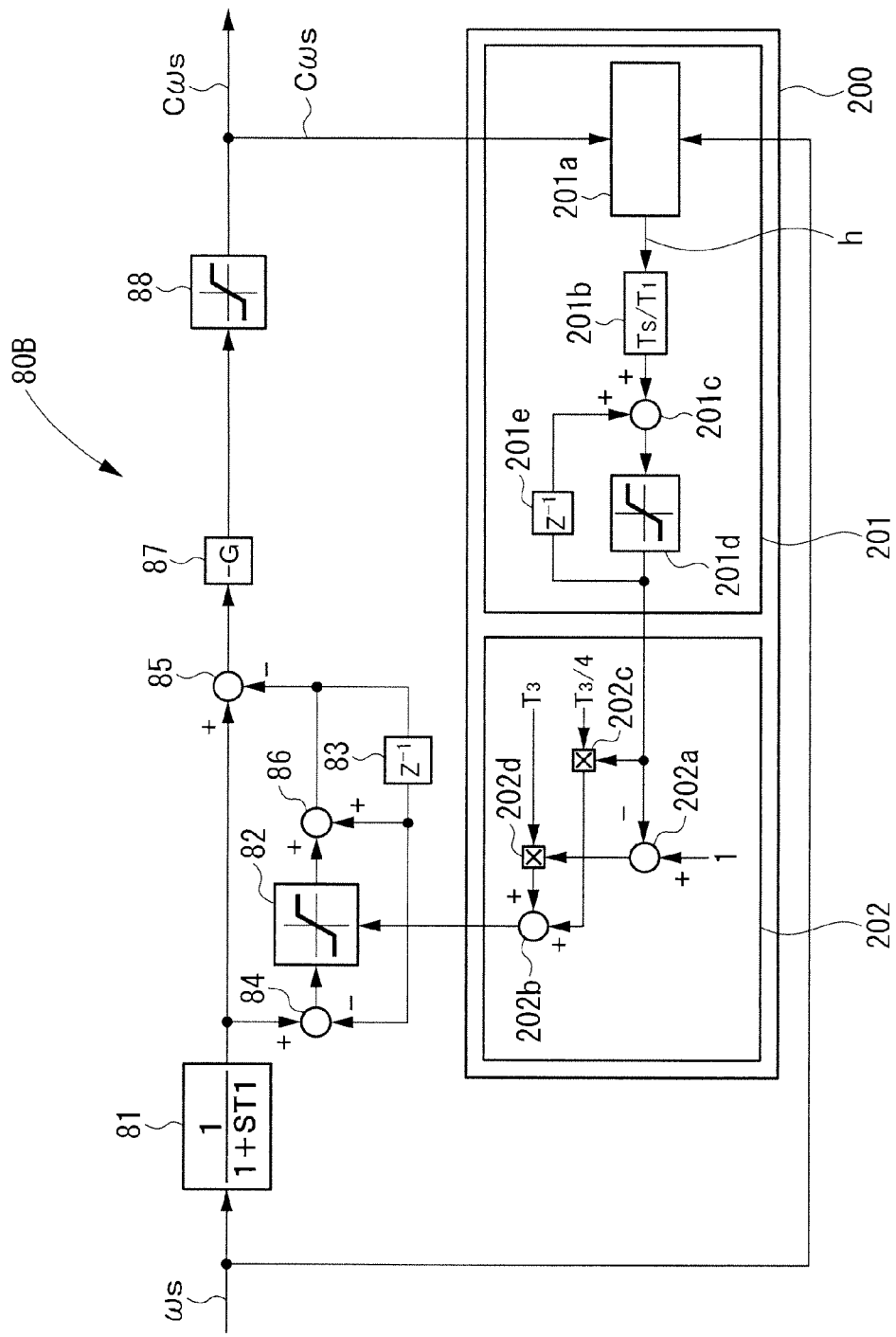
[FIG. 5] is a circuit configuration drawing showing a fluctuation detecting block according to Embodiment 3 of the present invention.

FIG. 5 shows a fluctuation detecting block 80B according to Embodiment 3 of the present invention. This fluctuation detecting block 80B has the configuration of the fluctuation detecting block 80A shown in FIG. 3, but in which the actions and functions of the interference action judgment block 201 and the cushioning time changing block 202 have been modified.

The interference action judgment block 201 has a judgment block 201a, a multiplier 201b, an adder 201c, a limiter 201d, and a delay circuit 201e.

The judgment block 201a has the aforementioned judgment conditions (i) and (ii) set therein and, when either of the reaction conditions (i) and (ii) is fulfilled, outputs the cushioning time changing signal h.

Since the multiplier 201b, the adder 201c, the limiter 201d, and the delay circuit 201e perform an integrating function, the cushioning time changing signal h outputted from the interference action judgment block 201 increases with the passage of time.

The cushioning time changing block 202 has a subtracter 202a, an adder 202b, and multipliers 202c, 202d, and has a time T3 and a time T3/4 set therein.

Upon receipt of the cushioning time changing signal h, the cushioning time changing block 202 gradually changes the cushioning time, which is set in the limiter 82, from T3 to T3/4. When the cushioning time changing signal h is not received any more, the cushioning time changing block 202 gradually returns the cushioning time, which is set in the limiter 82, from T3/4 to T3.

Compensating waveforms when the above-mentioned fluctuation detecting block 80B was used as the fluctuation detecting block 42 shown in FIG. 8 are shown in FIGS. 6(a) to 6(d).

Figure 6:
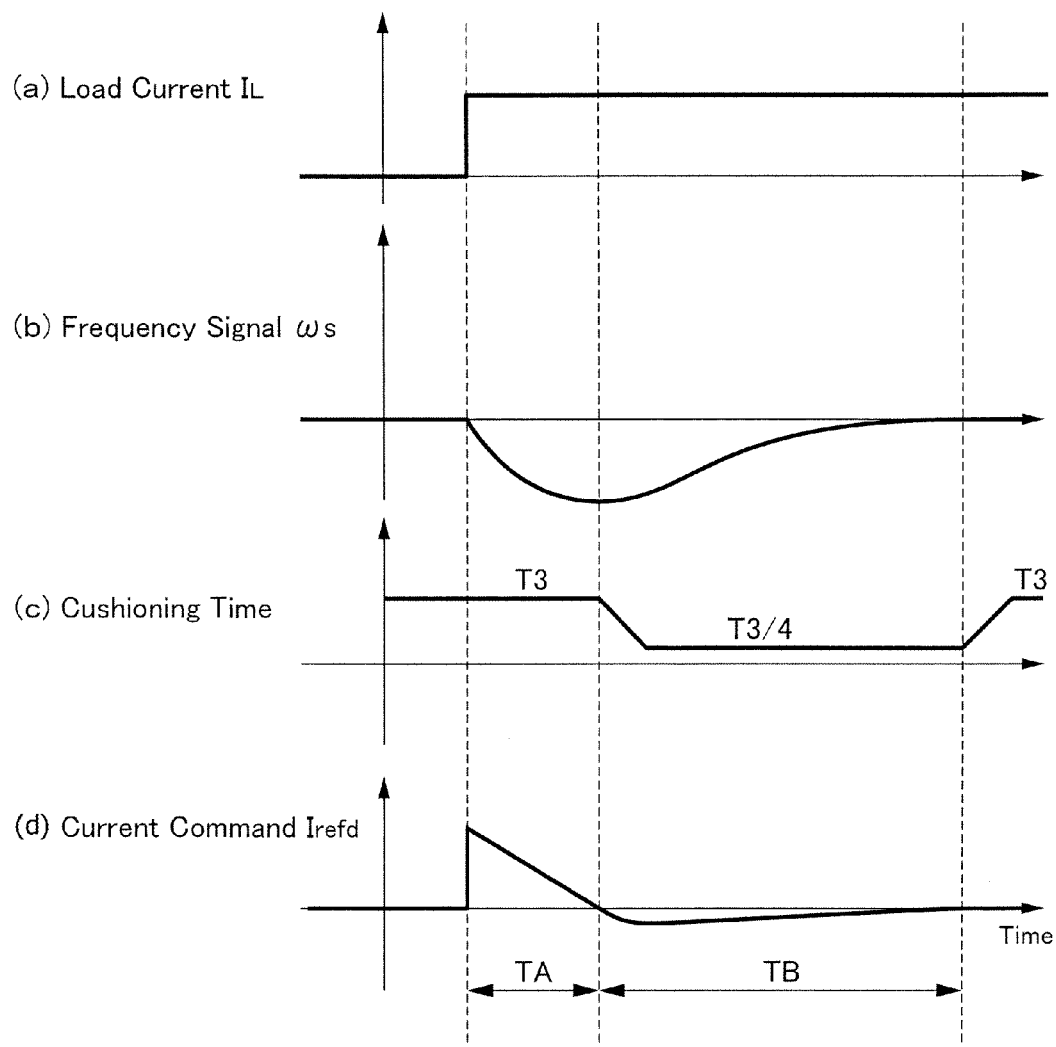
[FIGS. 6(a) to 6(d)] are characteristic charts showing compensating waveforms when the fluctuation detecting block of Embodiment 3 was used.
Figure 7:
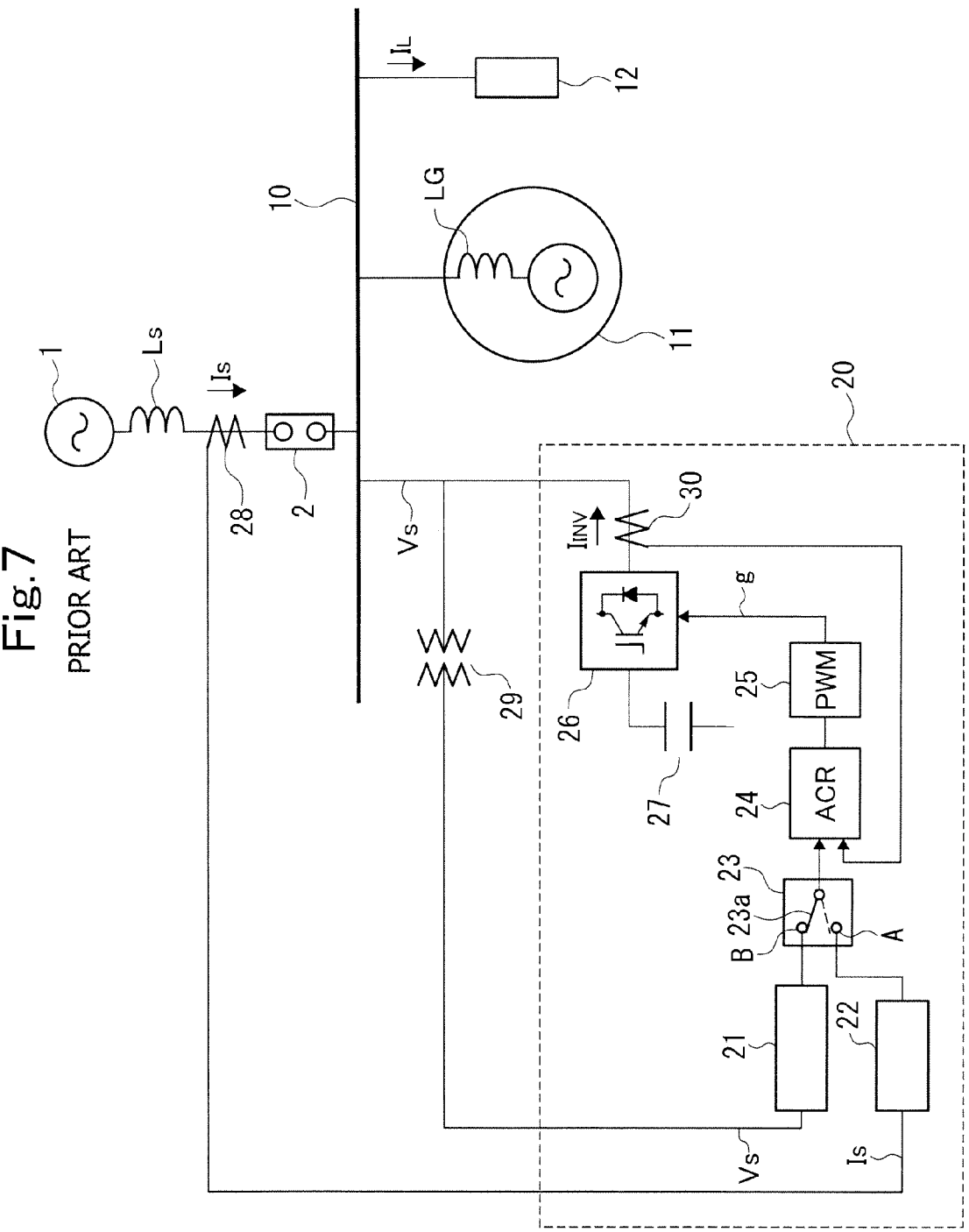
[FIG. 7] is a circuit configuration drawing showing a microgrid equipped with a system stabilizing device.

If the load suddenly changes as shown in FIG. 6(a), the cushioning time when changed from T3 to T3/4 or from T3/4 to T3 shows a gradual change in amount, as shown in FIG. 6(c).

As noted above, the cushioning time set in the limiter 82 gradually decreases, and then gradually recovers, so that adverse influence on other instruments or the system can be prevented.

Embodiment 4

In Embodiments 1 to 3 described above, the fluctuation detecting blocks 70A, 80A, 80B are applied to the fluctuation detecting block 42 of the system stabilizing device 20 shown in FIG. 8. However, the fluctuation detecting blocks 70A, 80A, 80B can be applied to the fluctuation detecting block 45.

In applying the fluctuation detecting blocks 70A, 80A, 80B to the fluctuation detecting block 45, the following judgment conditions (iii) and (iv), instead of the aforementioned (i) and (ii), are set in the interference action judgment blocks 101, 201 as judgment conditions for judging whether the system stabilizing action and the governor control action interfere with each other:

(iii) The value of the voltage amplitude |Vs| is smaller than a predetermined rated value, and the fluctuation component C|Vs| of the voltage amplitude |Vs| has a negative value or is negative.

(iv) The value of the voltage amplitude |Vs| is larger than the predetermined rated value, and the fluctuation component C|Vs| of the voltage amplitude |Vs| has a positive value or is positive.

If the fluctuation component C|Vs| is of a negative value, the power converter 26 acts to absorb the reactive power under the reactive current command $I_{refq}$ at this time. If the fluctuation component C|Vs| is of a positive value, the power converter 26 acts to release the reactive power under the reactive current command $I_{refq}$ at this time.

Depending on the circuit configuration, the positivity or negativity of the fluctuation component C|Vs|, and the reactive power absorbing or releasing action of the power converter 26 may be opposite to those mentioned above. In this embodiment, however, an explanation will be offered on the assumption that the above-mentioned actions are performed.

The interference action judgment blocks 101, 201 output changing signals H, h when a state where the judgment condition (iii) or (iv) is true continues for a predetermined set time.

Once the changing signals H, h are outputted, the changing blocks 102, 202 change the time constant T2 and the cushioning time T3, thereby making it possible to prevent the interference between the governor control action and the system stabilizing action.

That is, while the AVR control of the generator (action of increasing the generator voltage) is performed, the action of absorbing the reactive power by the system stabilizing device 20 is inhibited. While the AVR control of the generator (action of decreasing the generator voltage) is performed, the action of releasing the reactive power by the system stabilizing device 20 is inhibited. Thus, interference between the AVR control and the system stabilizing action can be prevented.

Embodiments 1, 4 mentioned above can also be realized by performing computations using computing programs (software) preset in a computer.

That is, with the embodiments utilizing software, the fluctuation detecting block 70A can be constructed as computing programs (software) incorporated into (set in) a computer as hardware, the computing programs for performing necessary computations for the fluctuation detecting block 70A.

With the fluctuation detecting block 70A according to the embodiments utilizing software, the following arithmetic operations or computations are performed by computing programs:

(1) The time constant T1 set for noise removal, and the time constant T2 determined for setting the fluctuation detection time are set in the computing programs.

(2) After completion of the above settings, the fluctuation detecting block 70A performs computations with the use of the computing programs to (2-1) carry out the first order lag filtering of the signal inputted to the fluctuation detecting block, with the time constant as T1, to determine a first filter signal, (2-2) carry out the first order lag filtering of the signal inputted to the fluctuation detecting block, with the time constant as T2, to determine a second filter signal, and (2-3) subtract the second filter signal from the first filter signal to determine a fluctuation component.

Further, according to the computations using the computing programs, the time constant T2 of the first fluctuation detecting block (42) is changed to a small value (i) when it is judged that the power converter absorbs the active power in accordance with the active current command obtained based on the fluctuation component (Cωs), by detecting that the positive or negative polarity of the fluctuation component (Cωs) is one of the positive and negative polarities when the frequency of the system voltage is smaller than a predetermined rated frequency, or (ii) when it is judged that the power converter releases the active power in accordance with the active current command obtained based on the fluctuation component (Cωs), by detecting that the positive or negative polarity of the fluctuation component (Cωs) is the other of the positive and negative polarities when the frequency of the system voltage is larger than the predetermined rated frequency.

Also, according to the computations using the computing programs, the time constant T2 of the first fluctuation detecting block (45) is changed to a small value (iii) when it is judged that the power converter absorbs the reactive power in accordance with the reactive current command obtained based on the fluctuation component (C|Vs|), by detecting that the positive or negative polarity of the fluctuation component (C|Vs|) is one of the positive and negative polarities when the voltage amplitude of the system voltage is smaller than a predetermined rated value, or (iv) when it is judged that the power converter releases the reactive power in accordance with the reactive current command obtained based on the fluctuation component (C|Vs|), by detecting that the positive or negative polarity of the fluctuation component (C|Vs|) is the other of the positive and negative polarities when the voltage amplitude of the system voltage is larger than the predetermined rated value.

The above Embodiments 2, 3, 4 can also be realized by performing computations using computing programs (software) preset in a computer.

That is, with the embodiments utilizing software, the fluctuation detecting blocks 80A, 80B can be constructed as computing programs (software) incorporated into (set in) a computer as hardware, the computing programs for performing necessary computations for the fluctuation detecting blocks 80A, 80B.

With the fluctuation detecting blocks 80A, 80B according to the embodiments utilizing software, the following arithmetic operations or computations are performed by computing programs:

(1) The time constant T1 set for noise removal, the arbitrarily set cushioning time T3, the one sampling period Ts, and the limiting value X are set in the computing programs.

(2) After completion of the above settings, the fluctuation detecting blocks 80A, 80B perform computations with the use of the computing programs to (2-1) carry out the first order lag filtering of the input signal inputted to the fluctuation detecting block, with the time constant as T1, to determine a filter signal, (2-2) subtract the delayed signal from the filter signal to determine a subtraction signal, (2-3) perform a limiting operation on the subtraction signal by use of limiting characteristics defined as $\pm(X/T3)Ts$ to determine a limit signal, (2-4) add the limit signal and the delayed signal to determine an addition signal, (2-5) delay the addition signal by one sampling period Ts to form the above delayed signal, and (2-6) subtract the addition signal from the filter signal to determine a fluctuation component.

Further, according to the computations using the computing programs, the cushioning time T3 of the limiter provided in the first fluctuation detecting block (42) is changed to a small value (i) when it is judged that the power converter absorbs the active power in accordance with the active current command obtained based on the fluctuation component (Cωs), by detecting that the positive or negative polarity of the fluctuation component (Cωs) is one of the positive and negative polarities when the frequency of the system voltage is smaller than a predetermined rated frequency, or (ii) when it is judged that the power converter releases the active power in accordance with the active current command obtained based on the fluctuation component (Cωs), by detecting that the positive or negative polarity of the fluctuation component (Cωs) is the other of the positive and negative polarities when the frequency of the system voltage is larger than the predetermined rated frequency.

Also, according to the computations using the computing programs, the cushioning time T3 of the limiter provided in the first fluctuation detecting block (45) is changed to a small value (iii) when it is judged that the power converter absorbs the reactive power in accordance with the reactive current command obtained based on the fluctuation component (C|Vs|), by detecting that the positive or negative polarity of the fluctuation component (C|Vs|) is one of the positive and negative polarities when the voltage amplitude of the system voltage is smaller than a predetermined rated value, or (iv) when it is judged that the power converter releases the reactive power in accordance with the reactive current command obtained based on the fluctuation component (C|Vs|), by detecting that the positive or negative polarity of the fluctuation component (C|Vs|) is the other of the positive and negative polarities when the voltage amplitude of the system voltage is larger than the predetermined rated value.

DESCRIPTION OF THE NUMERALS

1 Power system
2 Circuit breaker

10 Distribution system
11 Dispersed generation plant
12 Load
20 System stabilizing device
21 Self-contained control unit
22 Interconnected control unit
23 Change-over switch
24 Current control unit
25 PWM modulator
26 Power converter
27 Direct current charging unit
28 Current detector
29 Voltage detector
30 Current detector
40 Zero-crossing detecting unit
41 Frequency detecting unit
42 Fluctuation detecting unit
43 Integrator
44 Voltage amplitude detecting unit
45 Fluctuation detecting unit
46 Proportional computing unit
50 PLL circuit
60 dq transformer
61, 63 Subtracter
62, 64 Current control unit
65 dq inverse transformer
70, 70A Fluctuation detecting block
80, 80A, 80B Fluctuation detecting block
100, 200 Interference action inhibiting unit
101, 201 Interference action judgment block
102 Time constant changing block
202 Cushioning time changing block
ωs Frequency signal
Cωs Fluctuation component
|Vs| Voltage amplitude signal
C|Vs| Fluctuation component
$I_{refd}$ Active current command
$I_{refq}$ Reactive current command
g Gate signal

The invention claimed is:

1. A system stabilizing device provided in a distribution system to which a dispersed generation plant and a load are connected,
the system stabilizing device having a control mode during a self-supporting run, which is a control mode for compensating for an active power to be supplied to the distribution system as a frequency of a system voltage of the distribution system fluctuates, and also for compensating for a reactive power to be supplied to the distribution system as a voltage amplitude of the system voltage of the distribution system fluctuates,
the system stabilizing device having
a self-contained control unit which, in accordance with a fluctuation in the frequency of the system voltage, outputs an active current command for suppressing the fluctuation in the frequency, and in accordance with a fluctuation in the voltage amplitude of the system voltage, outputs a reactive current command for suppressing the fluctuation in the voltage amplitude, and
a power converter which performs a converting action and an inverting action in accordance with a gate signal determined based on the active current command and the reactive current command,
wherein the self-contained control unit has a first fluctuation detecting block for outputting a fluctuation component (Cωs) conformed to the frequency fluctuation of the system voltage, and a second fluctuation detecting block for outputting a fluctuation component (C|Vs|) conformed to the voltage amplitude fluctuation of the system voltage,
when a time constant set for noise removal is set to be T1, and a time constant determined for setting a fluctuation detection time is set to be T2, the first and second fluctuation detecting blocks are each composed of a first low-pass filter having first order lag characteristics with a time constant of T1, a second low-pass filter having first order lag characteristics with a time constant of T2, a subtracter for performing a subtraction between an output signal of the first low-pass filter and an output signal of the second low-pass filter, and an interference action inhibiting unit, and
the interference action inhibiting unit
changes the time constant T2 of the first fluctuation detecting block to a small value
(i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or
(ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and
changes the time constant T2 of the second fluctuation detecting block to a small value
(iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or
(iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

2. The system stabilizing device according to claim 1, wherein
the time constant T1 set for noise removal and the time constant T2 determined for setting the fluctuation detection time are set in each of the first and second fluctuation detecting blocks,
the first and second fluctuation detecting blocks each perform computations with use of computing programs to
carry out first order lag filtering of the signal inputted to the fluctuation detecting block, with a time constant as T1, to determine a first filter signal,
carry out first order lag filtering of the signal inputted to the fluctuation detecting block, with a time constant as T2, to determine a second filter signal, and
subtract the second filter signal from the first filter signal to determine a fluctuation component, the first fluctuation detecting block performs the computations with use of the computing programs to
change the time constant T2 of the first fluctuation detecting block to a small value
(i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or
(ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and
the second fluctuation detecting block performs the computations with use of the computing programs to
change the time constant T2 of the second fluctuation detecting block to a small value
(iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or
(iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

3. A system stabilizing device provided in a distribution system to which a dispersed generation plant and a load are connected,
the system stabilizing device having a control mode during a self-supporting run, which is a control mode for compensating for an active power to be supplied to the distribution system as a frequency of a system voltage of the distribution system fluctuates, and also for compensating for a reactive power to be supplied to the distribution system as a voltage amplitude of the system voltage of the distribution system fluctuates,
the system stabilizing device having
a self-contained control unit which, in accordance with a fluctuation in the frequency of the system voltage, outputs an active current command for suppressing the fluctuation in the frequency, and in accordance with a fluctuation in the voltage amplitude of the system voltage, outputs a reactive current command for suppressing the fluctuation in the voltage amplitude, and
a power converter which performs a converting action and an inverting action in accordance with a gate signal determined based on the active current command and the reactive current command,
wherein the self-contained control unit has a first fluctuation detecting block for outputting a fluctuation component (Cωs) conformed to the frequency fluctuation of the system voltage, and a second fluctuation detecting block for outputting a fluctuation component (C|Vs|) conformed to the voltage amplitude fluctuation of the system voltage,
when a time constant set for noise removal is T1, an arbitrarily set cushioning time is T3, one sampling period is Ts, and X is a limiting value, the first and second fluctuation detecting blocks are each composed of a low-pass filter having first order lag characteristics with a time constant of T1, a limiter having limiting characteristics defined as $\pm(X/T3)Ts$, a delay circuit for delaying an inputted signal by one sampling period Ts and outputting the delayed signal, a first subtracter, a second subtracter, an adder, and an interference action inhibiting unit,
the first subtracter performs a subtraction between an output signal of the low-pass filter having the first order lag characteristics and an output signal of the delay circuit, and feeds a resulting difference to the limiter,
the adder adds an output signal of the limiter and the output signal of the delay circuit, and outputs a resulting sum,
the delay circuit delays an output signal of the adder by one sampling period Ts, and outputs the delayed signal,
the second subtracter performs a subtraction between the output signal of the low-pass filter having the first order lag characteristics and the output signal of the adder, and outputs a resulting difference, and
the interference action inhibiting unit
changes the cushioning time T3 of the limiter provided in the first fluctuation detecting block to a small value
(i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or
(ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and
changes the cushioning time T3 of the limiter provided in the second fluctuation detecting block to a small value
(iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or
(iv) when judging that the power converter releases the reactive power in accordance with the reactive current command obtained based on the fluctuation component (C|Vs|), by detecting that the positive or negative polarity of the fluctuation component (C|Vs|) is other of the positive and negative polarities when the voltage amplitude of the system voltage is larger than the predetermined rated value.

4. The system stabilizing device according to claim 3, wherein
the time constant T1 set for noise removal, the arbitrarily set cushioning time T3, the one sampling period Ts, and the limiting value X are set in each of the first and second fluctuation detecting blocks, the first and second fluctuation detecting blocks each perform computations with use of computing programs to carry out first order lag filtering of the input signal inputted to the fluctuation detecting block, with a time constant as T1, to determine a filter signal, subtract the delayed signal from the filter signal to determine a subtraction signal, perform a limiting operation on the subtraction signal by the limiting characteristics defined as ±(X/T3)Ts to determine a limit signal, add the limit signal and the delayed signal to determine an addition signal, delay the addition signal by the one sampling period Ts to form the delayed signal, and subtract the addition signal from the filter signal to determine a fluctuation component, the first fluctuation detecting block performs the computations with use of the computing programs to change the cushioning time T3 of the limiter provided in the first fluctuation detecting block to a small value (i) when judging that the power converter absorbs the active power in accordance with the active current command obtained based on the fluctuation component (Cωs), by detecting that a positive or negative polarity of the fluctuation component (Cωs) is one of the positive and negative polarities when the frequency of the system voltage is smaller than a predetermined rated frequency, or (ii) when judging that the power converter releases the active power in accordance with the active current command obtained based on the fluctuation component (Cωs), by detecting that the positive or negative polarity of the fluctuation component (Cωs) is other of the positive and negative polarities when the frequency of the system voltage is larger than the predetermined rated frequency, and the second fluctuation detecting block performs the computations with use of the computing programs to change the cushioning time T3 of the limiter provided in the second fluctuation detecting block to a small value (iii) when judging that the power converter absorbs the reactive power in accordance with the reactive current command obtained based on the fluctuation component (C|Vs|), by detecting that a positive or negative polarity of the fluctuation component (C|Vs|) is one of the positive and negative polarities when the voltage amplitude of the system voltage is smaller than a predetermined rated value, or (iv) when judging that the power converter releases the reactive power in accordance with the reactive current command obtained based on the fluctuation component (C|Vs|) by detecting that the positive or negative polarity of the fluctuation component (C|Vs|) is other of the positive and negative polarities when the voltage amplitude of the system voltage is larger than the predetermined rated value.

* * * * *